Dec. 17, 1940.  E. A. LARSSON  2,225,418
CAR COUPLER
Filed April 7, 1939  3 Sheets-Sheet 1

Inventor
ERNST A LARSSON
By
Attorney

Dec. 17, 1940.  E. A. LARSSON  2,225,418
CAR COUPLER
Filed April 7, 1939  3 Sheets-Sheet 2

Inventor
ERNST A. LARSSON
By
Attorney

Dec. 17, 1940.  E. A. LARSSON  2,225,418
CAR COUPLER
Filed April 7, 1939  3 Sheets-Sheet 3

Inventor
ERNST A. LARSSON
By
Attorney

Patented Dec. 17, 1940

2,225,418

UNITED STATES PATENT OFFICE 2,225,418

CAR COUPLER

Ernst A. Larsson, Mansfield, Ohio, assignor to The Ohio Brass Company, Mansfield, Ohio, a corporation of New Jersey Application April 7, 1939, Serial No. 266,591

11 Claims. (Cl. 213—21)

My invention relates to car couplers and particularly couplers of the automatic coupling type suitable in industrial and mine operations.

One object of my invention is to provide a coupler in which resilient non-metallic material is employed for cushioning the impact at the instant of coupling and also to relieve the equipment of shocks during haulage.

Another object of my invention is to provide the coupler means to automatically center the heads when the couplers are in a non-coupled condition.

Another object of my invention is to provide the coupler means to permit one or more cars of a train consisting of a plurality of coupled cars, to be rotated about the axis of the coupler in order to dump the same without disturbing the other cars in the train.

My invention resides in the new and novel construction, combination and relation of the parts herein described and shown in the drawings accompanying this specification.

Figure 2:
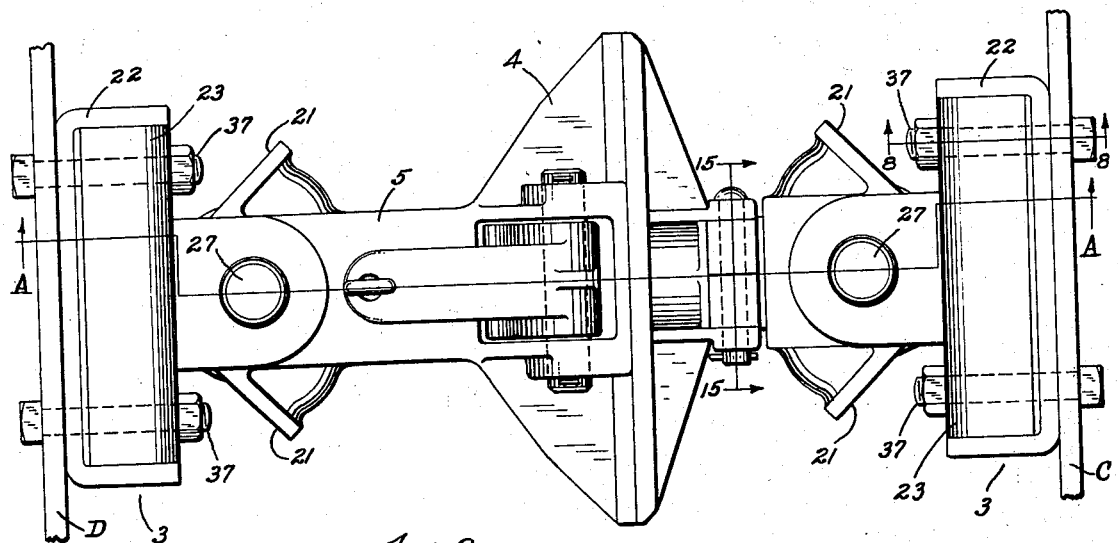
Fig. 2 is a top view of two heads in coupled relation and each attached to a support, as for instance the front plate of a car body.
Figure 8:
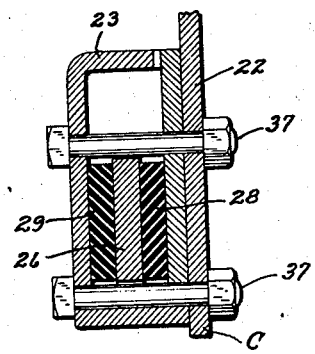

Fig. 8 taken on the line 8—8 of Fig. 2 shows in partial section a view of the resilient draft gear which I employ.

Figure 9:
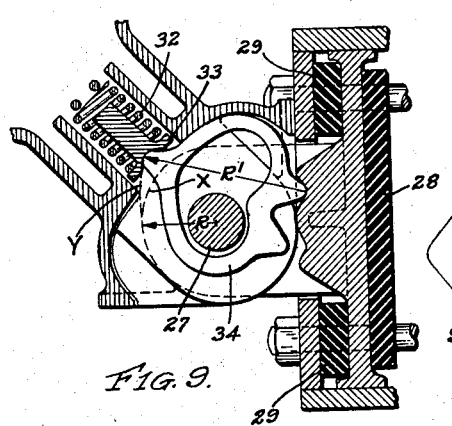
Figure 5:
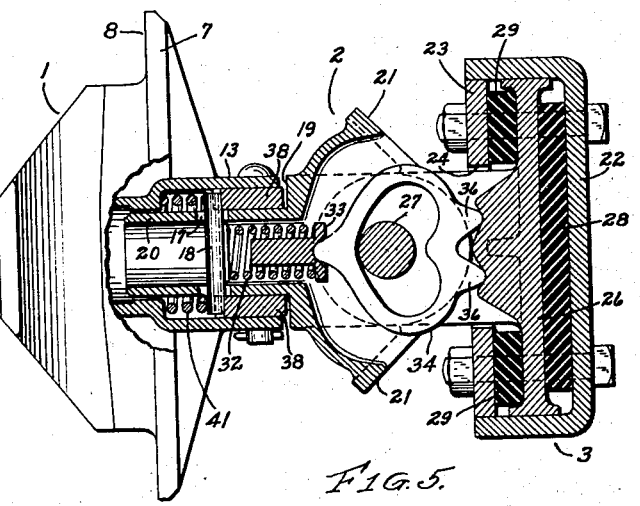
Fig. 5 is a view in partial section of the male head taken on a horizontal plane through the center line B—B of Fig. 3.

Fig. 9 is a sectional view corresponding to that of Fig. 5 showing the resilient anchorage and a portion of draw bar and centering mechanism when the coupler is out of normal or alignment with the longitudinal axis of the car.

Figure 4:
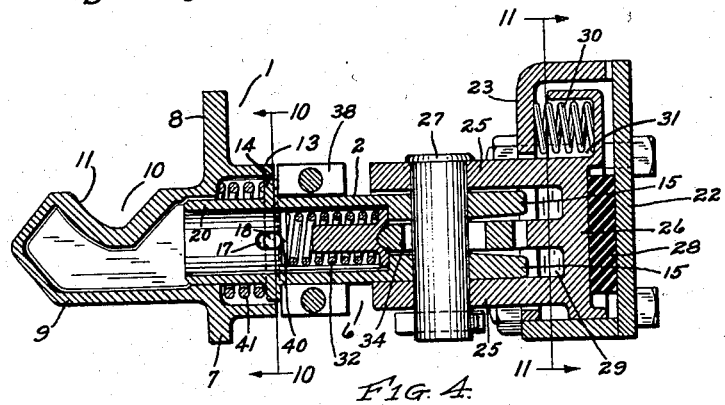
Fig. 4 is a view in partial section of the male coupler taken on a vertical plane through the center line A—A of Fig. 2.
Figure 10:
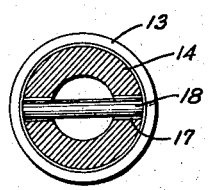

Fig. 10 is a view in partial section taken on the line 10—10 of Fig. 4.

Figure 11:
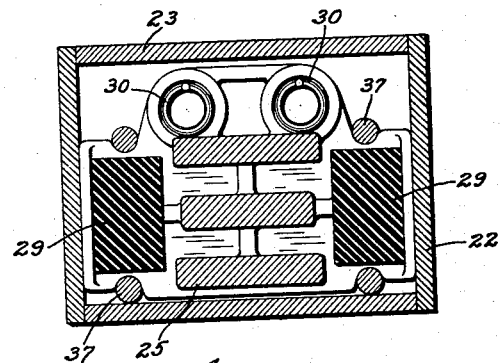

Fig. 11 is a view in partial section taken on the line 11—11 of Fig. 4.

Figure 12:
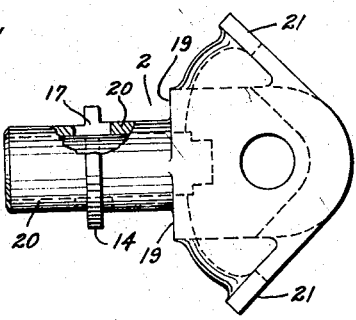

Fig. 12 is a top plan view in partial section of the draw bar used in combination with the male head.

Figure 13:
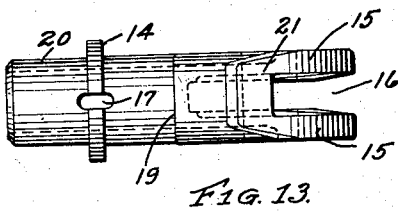

Fig. 13 is a view in side elevation of the draw bar shown in Fig. 12.

Figure 14:
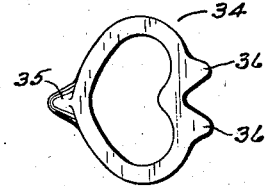

Fig. 14 is a plan view of a centering link which I employ as an element of the centering mechanism.

Figure 15:
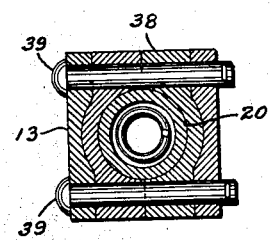

Fig. 15 is a view in partial section taken on the line 15—15 of Fig. 2.

The preferred embodiment of my invention comprises couplers of the type shown in Tomlinson Patent 1,609,444 which is of the automatic coupling type employing a male and a female head. This type of coupler permits making the complete coupler quite short which is very desirable in industrial and mine haulage and also permits of coupling when the cars are on curves of short radii, that is, when the longitudinal axes of the cars to be coupled are disposed at a very considerable angle from alignment.

Figure 1:
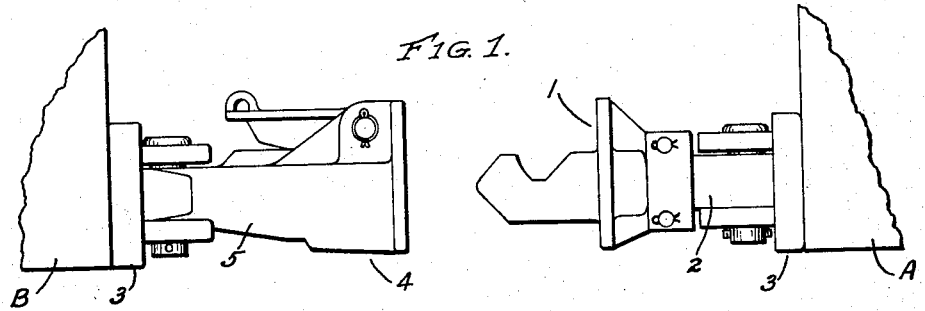
Fig. 1 represents two car bodies with two couplers, one on each car, in position to be coupled, the right-hand coupler being of a male type and the left-hand coupler being of a female type.

The male coupler consists in general of a head 1, a draw bar 2, and a resilient anchorage 3, and in Fig. 1 these parts are shown assembled and mounted on a car body A.

The female coupler comprises a head 4 which has integrally combined with it a draw bar 5, and the resilient anchorage 3 attached to a car body B, as shown in Fig. 1.

The male head comprises a flange 7 having a buffing face 8 and a hollow projecting tongue 9. The tongue 9 is provided with a transverse slot 10 which has a bearing face 11 for the lock or latch 12 (shown in Fig. 6). The head is also provided with a collar portion 13.

Slidably mounted in the rear end of the head 1 in telescopic relation thereto is the draw bar 2 provided with a collar 14 and a clevis end which is formed of spaced portions 15 forming the slot 16 therebetween. The draw bar is provided with oppositely disposed slots 17 which cut through the flange 14 to receive a pin 18 for the purpose later described. The draw bar is provided on the sides with butting faces 19 which are absent above and below, that is, these faces do not extend entirely around the tubular cylindrical portion 20 as shown in Figs. 12 and 13 and therefore a space 6 exists on the upper and lower sides of the coupler as shown at 6.

The draw bar is also provided with buffing faces 21 which are arranged to engage with the resilient anchorage 3 should the coupler swing away from its normal position in excess of a predetermined amount.

The resilient anchorage 3 is shown as comprising a back plate 22 which forms the back and vertical side walls of a receptacle. The anchorage is also provided with a front plate 23 which is shown as fitting between the side walls of the plate 22 and also forming the top and bottom sides of the anchorage receptacle. The plate 23 has an opening 24 through the front face and through which projects the spaced members 25 of the clevis member 26.

The spaced members 25 form a clevis within which is mounted the clevis end of the draw bar held in pivotal relation to the clevis member by the pin 27 which extends through registering openings in the portions 15 and 26. Between the plates 22 and 23 and the clevis member 26 are positioned heavy resilient cushion members 28 and 29 arranged to take the impact and buff between the coupler and the car both in coupling and during haulage and permits the plate 23 to yield rearwardly under impact.

In order to better assist the resilient pads 28 and 29 in supporting the coupler head in a horizontal position, I employ between the upper portion of the clevis member 26 and the front plate 23, springs 30 normally under compression and preferably located in sockets or pockets 31 forming a part of the clevis member 26.

The spring 30 may be replaced with resilient pads of rubber or other equivalent material the same as I employ in the pads 28 and 29 and which might be termed "car spring rubber." If desired the resilient pads 28 and 29 may be positioned in the upper end of the receptacle between the clevis member 26 and the vertical walls of the receptacle in which case the springs 30 will be mounted at the lower end of the receptacle between the clevis member 26 and the back wall 22 instead of the front wall 23.

The centering means comprises a spring 32 mounted in the hollow of the cylinder 20 and butting against the pin 18. The other end of the spring 32 is provided with a pivot plate 33 which has a projection extending within the spring 32 as a guide.

Positioned in the opening 16 between the members 15 of the draw bar 2 is a centering link 34, as shown in Figs. 4, 5, and per se in Fig. 14.

The link 34 is provided with a pivot 35 to engage the plate 33 and also has fulcrums 36, both of which are seated against the clevis plate 26 when the coupler is in its normal position, that is, when the head is centered, as shown in Fig. 5. The head 1 and draw bar 2 may swing in unison about the axis of the pin 27 while the centering link 34 swings about the point of one of the fulcrums 36 depending upon the direction of swing.

Referring to Fig. 5, the coupler as a whole will pivot about the axis of the pin 27 and assuming the link 34 had no effect upon the spring 32 then the right-hand end of the spring and the pivot plate 33 would follow the path X, the radius of which is R (see Fig. 9). However, with the link 34 operating as it does the right-hand end of the spring 32 and the pivot plate 33 will follow the path Y, the radius of which is R' and it will be noted from Fig. 9 that this will produce a compression of the spring 32 such that as the coupler swings to the right or to the left as the case may be about the axis of the pin 27 the spring 32 will be compressed depending upon the degree of swing of the coupler from the normal position. The normal tension upon the spring 32, that is, when the coupler is in the longitudinal aligned position with respect to the axis of the car body, will be sufficient to hold the coupler in its central or normal position, and any pivotal movement of the coupler from this normal position will increase the tension and make the return of the coupler to its normal position that much more positive, when uncoupled.

Figure 3:
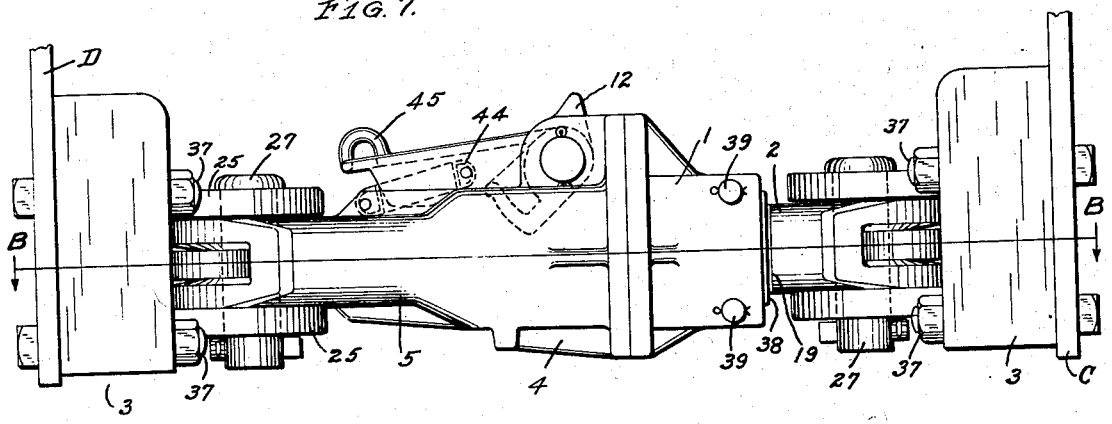
Fig. 3 is a side view of Fig. 2.

In Figs. 2 and 3 the couplers are shown attached to front plates C and D of the car bodies and held in position by means of bolts 37 and these bolts not only hold the resilient anchorage 3 to the car body but also hold the parts of the anchorage in assembled relation. In Figs. 4 to 7 inclusive the bolts are shown as merely holding the parts of the anchorage in assembled relation but the bolts may be replaced by longer bolts when the device is to be attached to a car body.

In order to permit the cars to be rotated about their longitudinal axis relative to each other, as in the case of dumping a loaded car at a tipple, it is necessary that one of the pair of couplers rotate relative to the other about its longitudinal axis, and to secure this relative rotation I employ a special construction with respect to the male coupler although the same construction may be applied to the female coupler.

Referring to Figs. 4 and 5, I provide the slot 17 in which is positioned the pin 18. Surrounding the cylindrical portion 20 of the draw bar, is a split collar composed of like parts 38 which are mounted within the sleeve 13 which is an integral part of the head 1 and held in place by means of the pins 39. The collar 38 fills the space between the end face 19 of the draw bar and the flange 14 and is rotatable with the head since the pins 39 lock the collar 38 and 13 against relative rotation.

The face of each member 38 adjacent the pin 18 is provided with a notch 40, preferably V shaped, in which the pin rests when the coupler heads are in their normal position, that is, in an aligned position to be coupled. To maintain the pin 18 in the notches 40, a spring 41 is employed which butts against the pin 18 and which tends to move the head 1 and the sleeve 38 outwardly, but moves the pin inwardly because the collar 38 butts against the flange 14 of the draw bar which prevents relative movement in one direction and the buffing faces 19 will engage the adjacent face of the collar 38 and prevent relative movement in the other direction. The spring 32 also butts against the pin 18 as a matter of convenience largely and therefore the spring 41 is made of sufficient strength to overcome any chance of the spring 32 moving the pin 18 out of the grooves 40 in the sleeve 38.

It will be evident with the resilient anchorage 3 fixed to a car and the draw bar 2 non-rotatable relative thereto, that if sufficient effort is exerted on the head 1 to rotate the same that when the tension of the spring 41 is overcome the pin 18 will ride out of the groove 40 permitting the head 1 to rotate relative to the draw bar 2. Under normal conditions and when the head 1 is not coupled to its companion coupler, the pin 18 will be seated in the V groove 40 and held there by the spring 41.

Figure 6:
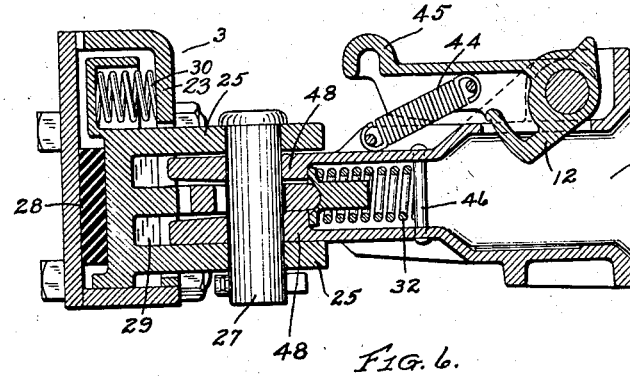
Fig. 6 is a view in partial section of the female coupler taken on a vertical plane through the center line A—A of Fig. 2.
Figure 7:
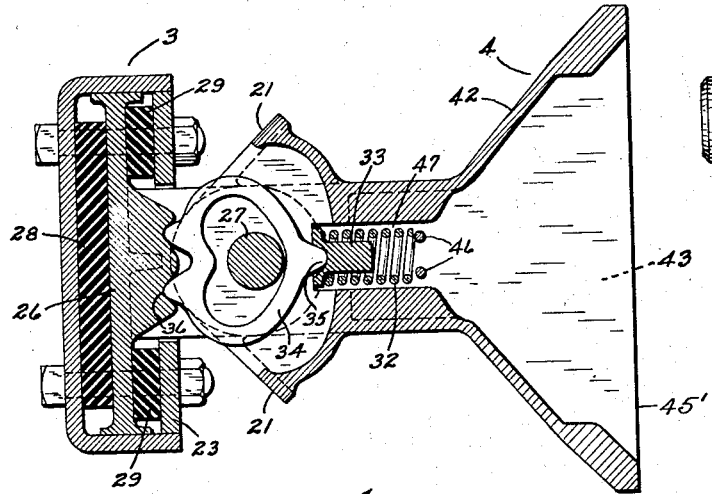
Fig. 7 is a view in partial section of the female head taken on a horizontal plane through the center line B—B of Fig. 3.

In Figs. 6 and 7 are shown sections of the female head. The construction of the resilient anchorage 3 is the same as that of the anchorage 3 as just described in connection with the male coupler and a repeated description is believed not necessary as the parts are numbered the same for both anchorages. In the description and drawings of the female head, I have used the same numerals to designate the like parts in the male coupler wherever the construction and function are the same.

The female head 42 is provided with an opening 43 arranged to receive the projection 9 on the male head and to hold the same substantially without transverse or rotational movement relative to each other. Pivotally mounted on the head 42 is the lock 12 held in the locked position by the spring 44 and opened normally by means of the handle 45. It will be apparent that when the two heads are brought together, the lock 12 will be automatically moved out of its locking position and will drop back into the slot 10 on the male head when the heads are in coupled relation thus holding the heads against uncoupling. Projecting rearwardly from the head 42 is the draw bar 5 which is provided with the buffing faces 21 as in the case of the male head just described and which will engage with the front plate 23 of the anchorage if the head is swung too far from normal. The head 42 is provided with a flange 45' which butts against the face 8 of the male head when two heads are brought together. The coupler is provided with a centering device of the same principle and largely of the same construction as previously described and comprises a spring 32 which butts against the through rivets 46 and which at the other end is provided with a pivotal plate 33. The spring 32 and plate 33 are mounted within the draw bar and which has a hollow cylindrical portion 47 and which rearwardly projecting spaced members 48 which fit in the space between the projecting members 25 and are held in pivotal relation thereto by means of the pin 27.

The draw bar is also provided with the centering link 34 whose relation to the draw bar and its operation is the same as previously explained.

When two heads are brought together the impact takes place between the faces 8 and 45' and this impact is transmitted to the resilient cushions 28. After the couplers are coupled and in haulage operation all further surges are taken up by the forward and back resilient cushions.

When it is desired to rotate or dump one car relative to its adjoining coupled car it is only necessary to place such car upon the tipple and rotate the tipple and the force exerted will overcome the tension of the spring 41 of the male coupler and permit the sides of the grooves 40 to force the pin 18 out of the grooves and permit the two heads to rotate with the car and relative to the stationary car.

The front plate 23 is so constructed and related to the plate 22 that it is adjustable and movable towards or away from the plate 22 whereby the resiliency of the members 28, 29 and 30 may be controlled to a considerable extent by the bolts 37.

Modifications will suggest themselves to those skilled in the art, and, therefore, I wish to be limited only by my claims.

I claim:

1. In a car coupler mechanism comprising a head for coupling to a cooperating head and an anchorage for attaching the coupler to a car and also having a drawbar to pivotally attach the head to the anchorage for lateral swing of the head, the anchorage having faces transversely disposed relative to the longitudinal axis of the car coupler mechanism the combination with the drawbar of means projecting laterally from opposite sides of the drawbar adjacent the anchorage to engage with the transversely disposed anchorage faces to limit the lateral swing of the head from its central position to either side thereof, the said means each having a vertical face obliquely disposed to the center axis of the head and drawbar, the angle of the faces to the said axis depending upon the degree of swing desired and the apex of the angle formed by extending the said obliquely disposed faces being located to the rear of the pivotal axis of the drawbar.

2. In combination, a bumper support constituting a receptacle and composed of front and back parallel plates, an intermediate plate substantially parallel to the front and back plates, rubber cushions disposed in parallel relation to said plates between said plates whereby impact in either direction normal to the said plates will be absorbed by the said rubber cushions, openings in the front plate through which project spaced tongues integrally formed with the said intermediate plate between which tongues a slot is formed in which may be positioned the end of a coupler and means extending through the said front and back plates whereby they may be moved towards each other to clamp and hold the said plates and cushions in place.

3. In combination, a bumper support comprising front and back parallel plates, a draft member comprising a plate portion positioned intermediate the first said plates and having spaced lugs projecting through openings therefor in the front plate and forming a clevis to receive a draft gear end, resilient cushions of organic material interposed between the plate of the draft member and the other plates to receive impact forces in directions normal to the said plates, other resilient cushions between the plate of the draft member and the front member to assist the first said cushions to maintain the horizontal longitudinal axis of the draft member substantially normal to the front and back plates and means to hold the front and back plates and the intermediate parts in assembled relation.

4. In combination, a bumper support comprising front and back parallel plates, a draft member comprising a plate portion positioned intermediate the first said plates and having spaced lugs projecting through openings therefor in the front plate and forming a clevis to receive a draft gear end, resilient cushions of organic material interposed between the plate of the draft member and the other plates to receive impact forces in directions normal to the said plates, other resilient cushions of metal between the plate of the draft member and the front member to assist the first said cushions to maintain the horizontal longitudinal axis of the draft member substantially normal to the front and back plates and means to hold the front and back plates and the intermediate parts in assembled relation.

5. In combination, a bumper support comprising front and back parallel plates, a draft member comprising a plate portion positioned intermediate the first said plates and having spaced lugs projecting through openings therefor in the front plate and forming a clevis to receive a draft gear end, resilient cushions of organic material interposed between the plate of the draft member and the other plates to receive impact forces in directions normal to the said plates, other resilient cushions between the plate of the draft member and the front member to assist the first said cushions to maintain the horizontal longitudinal axis of the draft member substantially normal to the front and back plates and means to hold the front and back plates and the intermediate parts in assembled relation.

6. In combination, a coupler anchorage comprising front and back plates, a draft member comprising a plate-like portion positioned intermediate the first said plates and having spaced lugs projecting through openings therefor in one of the plates to receive the end of a coupler draft gear, resilient cushions between the said plate-like portion and the first said plates to absorb the traction surges exerted thereon in both directions, the front plate being movable towards the back plate and adjustable means cooperating with the front and back plates whereby the pressure upon the resilient cushions may be varied.

7. In combination, a coupler anchorage comprising front and back plates, a draft member comprising a plate-like portion positioned intermediate the first said plates and having three parallel spaced lugs projecting through openings therefor in one of the plates to receive the end of a coupler draft gear, resilient cushions between the said plate-like portion and the first said plates to absorb the traction surges exerted thereon in both directions, the front plate being movable towards the back plate and adjustable means cooperating with the front and back plates whereby the pressure upon the resilient cushions may be varied the central one of the three parallel plates arranged to cooperate with means on the coupler draft gear to effect an automatic centering of the coupler when uncoupled.

8. In combination, a coupler anchorage adapted to be secured to a car comprising front and back plates, a draft member comprising a plate-like portion positioned between the first said plates and having spaced lugs projecting through openings in one of the plates to receive a coupler tail, resilient cushions of non-metallic material positioned between the said plate-like portion and the said plates to act under compression to absorb the traction surges exerted thereon in both directions, resilient metallic means interposed between the plate-like portion and one of the first said plates to assist the resilient cushions in maintaining the draft member in proper alignment when supporting a coupler, means cooperating with the plate-like portion and with the resilient metallic means to maintain the relation of the said means to the other parts of the combination and means to hold the parts in assembled relation.

9. A car coupler adapted to be mounted on a car and to couple with a companion coupler fixed against rotation upon its longitudinal axis comprising in combination a head member provided with a rearwardly projecting body member slidably and rotatably associated therewith, an anchor member pivotally attached to the said body member to support the aforesaid members and permit them to pivot laterally, a metal receptacle to receive a portion of the anchor member, the receptacle provided with a supporting member whereby it may be attached to a car and also provided with a yieldable front member, means on the body member to engage the said front member when the head pivots to a predetermined position, resilient material interposed between the said portion of the anchor member and the adjacent walls of the supporting member and the front member to cushion the force of draft and buff and also the pressure of the last said means on said front member when the body member pivots sideways beyond its limit, a spring pressed centering member positioned within the body member and provided with a pair of spaced fulcrum points engaging the anchor member on opposite sides of a vertical plane coinciding with the longitudinal axis of the coupler, the spring pressure on the centering member being exerted longitudinally toward the anchor member whereby the head and body members are held in their normal position when uncoupled and are constantly urged to return to the normal position when moved sideways therefrom, spring held latching means cooperating with the head member and with the body member to yieldingly hold the members in a predetermined relation whereby the head members may couple with the companion head when brought together but permitting the head member to rotate relative to the body member when sufficient rotatable force is applied to the head member to overcome the force of the spring holding the latching means, and means associated with the aforesaid head member to cooperate with means on the companion coupler to hold the couplers in coupled relation.

10. A car coupler adapted to be mounted on a car and to couple with a companion coupler fixed against rotation upon its longitudinal axis comprising in combination a head member provided with a rearwardly projecting body member slidably and rotatably associated therewith, an anchor member pivotally attached to the said body member to support the aforesaid members and permit them to pivot laterally, a metal receptacle to receive a portion of the anchor member, the receptacle provided with a supporting member whereby it may be attached to a car and also provided with a yieldable front member, means on the body member to engage the said front member when the head pivots to a predetermined position, resilient material interposed between the said portion of the anchor member and the adjacent walls of the supporting member and the front member to cushion the force of draft and buff and also the pressure of the last said means on said front member when the body member pivots sideways beyond its limit, spring held latching means cooperating with the head member and with the body member to yieldingly hold the members in a predetermined relation whereby the head members may couple with the companion head when brought together but permitting the head member to rotate relative to the body member when sufficient rotatable force is applied to the head member to overcome the force of the spring holding the latching means, and means associated with the aforesaid head member to cooperate with means on the companion coupler to hold the couplers in coupled relation.

11. A car coupler adapted to be mounted on a car and to couple with a companion coupler comprising in combination a head member provided with a rearwardly projecting body member, an anchor member pivotally attached to the body member to permit the head and body members to pivot laterally, a receptacle to receive a portion of the anchor member, the receptacle provided with a supporting member and yieldable front member, resilient material interposed between the said portion of the anchor member and the front member and the back member to cushion longitudinal forces of draft and buff, means on the body member to engage the front member to limit and cushion undue lateral swing of the head and body members, and means associated with the head member to cooperate with means on the companion head to hold the heads in coupled relation.

ERNST A. LARSSON.